United States Patent [19]

Borba et al.

[11] 4,047,504
[45] Sept. 13, 1977

[54] GROOMING IMPLEMENT FOR HORSES

[76] Inventors: Paul A. Borba, 626 Smith Neck Road; Harry R. Miller, 751 Potomska Road, both of South Dartmouth, Mass. 02748

[21] Appl. No.: 704,426

[22] Filed: July 12, 1976

[51] Int. Cl.² .......................................... A01K 13/00
[52] U.S. Cl. .................... 119/92; 15/236 R; 17/66; 30/172; 30/304; 145/108 R
[58] Field of Search ................ 119/83, 85, 86, 92, 119/94; 17/66, 69; 30/304, 172, 312, 314, 317, 340, 343; 145/61 R, 31 A, 61 J, 31 B, 64, 31 E, 108 R; 15/236 R

[56] References Cited

U.S. PATENT DOCUMENTS

| 348,067 | 8/1886 | Spear | 119/85 |
|---|---|---|---|
| 2,609,020 | 9/1952 | Becker | 145/108 R |
| 2,662,569 | 12/1953 | Swalinkavich, Jr. | 145/108 R |
| 2,800,879 | 7/1957 | Quick | 119/92 |
| 3,160,142 | 12/1964 | Torrow | 119/92 |
| 3,270,368 | 9/1966 | Cook, Sr. et al. | 30/304 |

FOREIGN PATENT DOCUMENTS

| 415,684 | 8/1934 | United Kingdom | 30/172 |

*Primary Examiner*—Louis G. Mancene
*Assistant Examiner*—Peter K. Skiff

[57] ABSTRACT

A grooming implement has hand grips and two blades corresponding edges of which have a lengthwise series of teeth. The blades include parallel, spaced-apart grooming portions that remain substantially parallel when the implement is held by the hand grips with the blades curved as one end of one blade is slidable relative to the other blade.

10 Claims, 5 Drawing Figures

U.S. Patent  Sept. 13, 1977  4,047,504
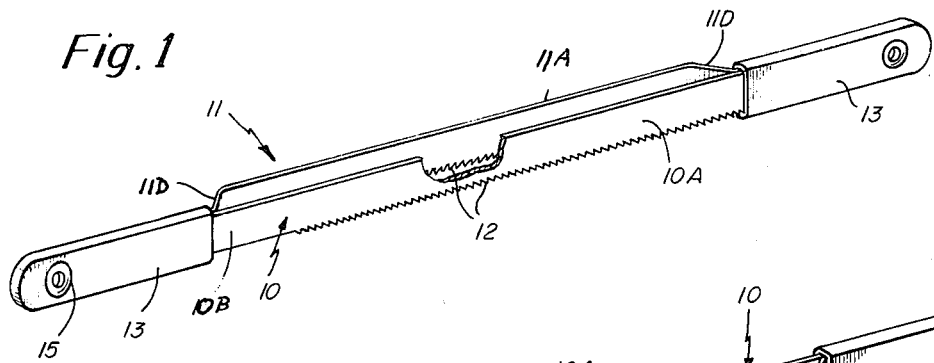
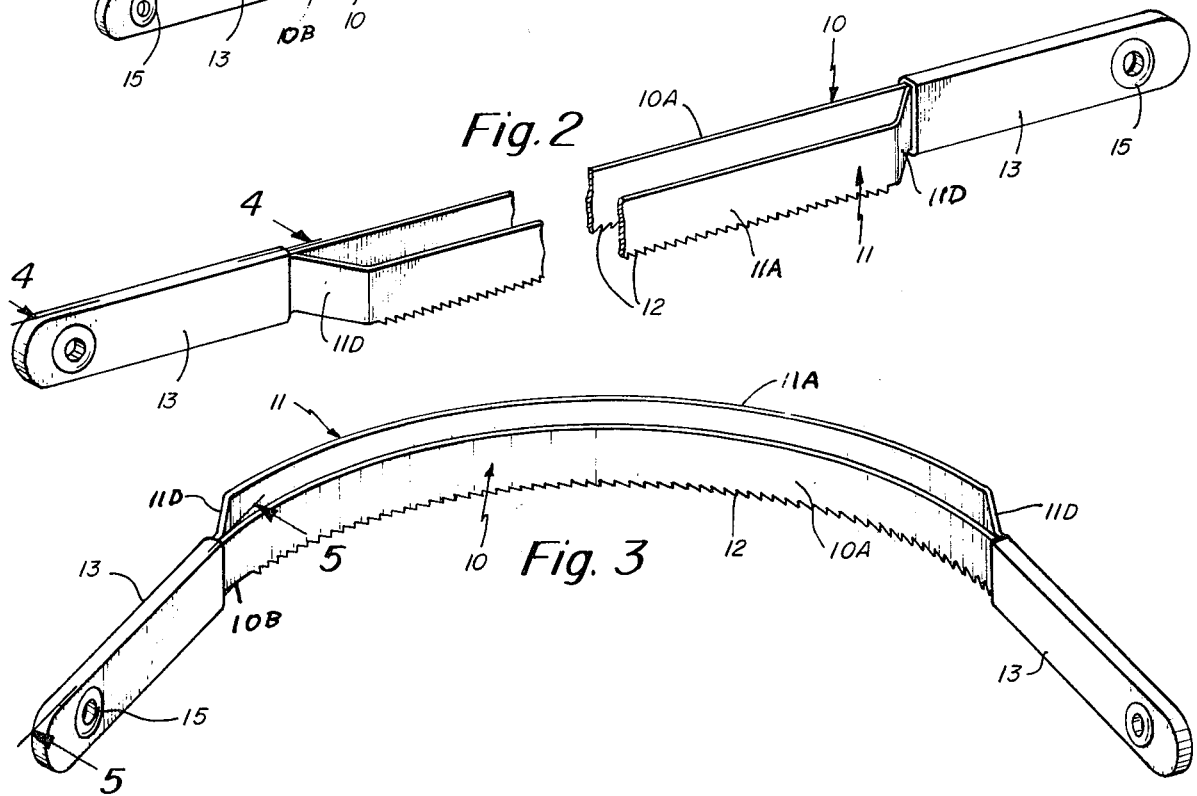
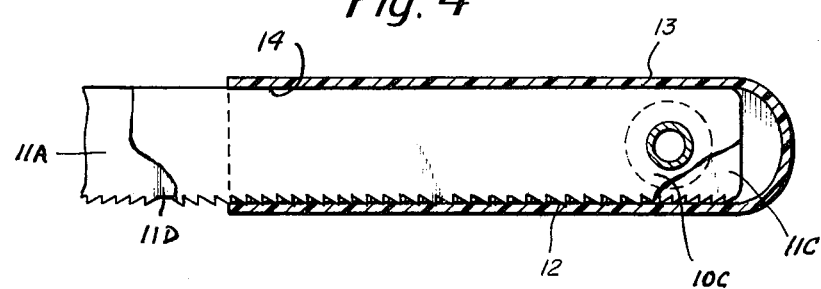
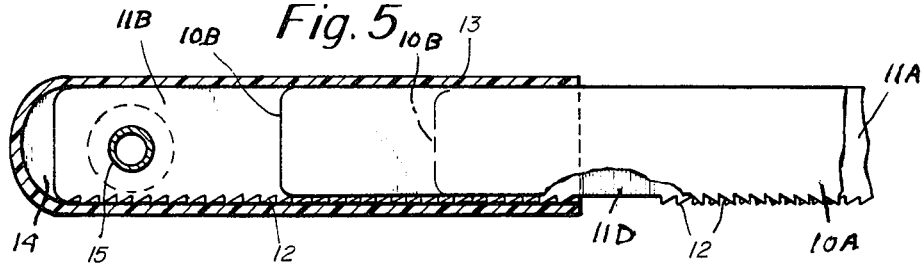

GROOMING IMPLEMENT FOR HORSES

RELATED APPLICATION

Ser. No. 553,670, filed Feb. 27, 1975

BACKGROUND REFERENCES

U.S. Pat. No. 348,067
U.S. Pat. No. 2,800,879

BACKGROUND OF THE INVENTION

The proper care of a horse requires year round grooming with the principal problems being loose hair, matted hair, dirt, and dandruff but there are times when grooming requires that sweat or water be scraped from its hide.

THE PRESENT INVENTION

The general objective of the present invention is to provide a grooming implement that is adaptable for use in various grooming functions, an objective attained with an implement having flexible blade means of substantial length with hand grips at the ends thereof. The blade means consist of a pair of blades with corresponding edges provided with a series of teeth. The grooming portion of one blade is offset relative to the grooming portion of the other and the grooming portions are normally straight and parallel. One end of one blade is slidable relative to the other blade so that when the two handles are drawn towards each other to curve the blades for grooming uses, the two grooming portions will remain spaced apart and substantially parallel.

Another objective of the invention is to provide such a grooming device in which each hand grip receives a pair of blade ends, one end of one blade being without teeth so that it may slide relative to the hand grip into which it extends, when the hand grips are drawn towards each other with said one blade proximate to the user.

Another objective of the invention is to provide maximum grooming effectiveness, an objective attained with a blade construction such that with blade stock having inclined teeth, the blades may be arranged with the teeth of one inclined in a direction opposite to the teeth of the other, both hand grips having slots dimensioned to receive the blade ends and of a material into which the blade teeth bite, the teeth anchor the blade ends and, in practice, the blade ends, except for the sliding end, are positively secured by grommets.

BRIEF DESCRIPTION OF THE DRAWINGS

A preferred embodiment of the invention is illustrated in the accompanying drawings and FIG. 1 is a perspective view of a grooming implement;

FIG. 2 is a like view of the implement on a somewhat increased scale, as seen from its other side;

FIG. 3 is a perspective view of the implement disposed for use;

FIG. 4 is a section on a substantial increase in scale taken along the indicated line 4—4 of FIG. 2; and FIG. 5 is a like section taken approximately along the indicated line 5—5 of FIG. 3.

THE PREFERRED EMBODIMENT OF THE INVENTION

The grooming implement illustrated by the drawings includes first and second flexible blades indicated generally at 10 and 11, respectively. Each blade has a series of teeth 12 extending along one edge and may be and in practice is a length of band saw stock. While the number of teeth per inch, their pitch and type may vary, it is preferred that both blades be lengths of the same band stock but disposed so that the pitch of the teeth of one blade is opposite the pitch of the teeth of the other to ensure maximum grooming effectiveness.

The blade 10 includes a central grooming protion 10A and ends 10B and 10C while the blade 11 includes a central grooming portion 11A, ends 11B and 11C and bends 11D offsetting the grooming portion 11A relative to the grooming portion 10A of the blade 10.

Each of a pair of hand grips 13 is in the form of a sheath having a socket 14 in the form of a slot opening through one end and of a length and width such that corresponding ends of both blades may be entered therein. The hand grips are molded from a plastic, vinyl in the case of the disclosed embodiment. the blade 11 is shown as so disposed that the teeth 12 of the blade end 11C bite into the hand grip material so as to prevent movement of that end of the blade 11 relative to the handgrip 13 into which it and the blade end 10C have been forced when the implement is used. As the teeth in the blade end 11B are disposed in the wrong direction to enable them to become anchored in the same manner in the other hand grip 13, the use of the grommet 15 is necessary since the corresponding end of the blade 10 is without teeth. The grommet 15 is of course a desirable means of locking the blade end 11B to its hand grip since it enables the implement to be hung thereby when it is not in use. It should be noted that the blade ends 10C and 11C while a snug fit in the hand grips 13, are more or less locked together by the teeth 12 which desirably have enough of a set to ensure that result while the blade end 10B slides in the hand grip 13 relative to the blade end 11B. in practice, the blade ends 10C and 11C are also secured to their hand grip 13 by a grommet 15.

As will be apparent from FIGS. 1 and 2, when the implement is not in use, the grooming portions 10A and 11A are straight and parallel. In use, the implement is held by its hand grips 13 which are pulled towards each other until the grooming portions are curved to the desired extent. As the use of two blades is of advantage to the extent they are spaced apart during grooming, means are provided to permit such spacing as the implement is readied for use.

It will be seen that the end 10B is shorter than the end 10C and does not include teeth throughout its length. As a consequence, the end 10B is free to slide relative to the hand grip 13 within which it is confined and as the hand grips are drawn towards each other to curve the blades, the end 10B advances into its hand grip 13 thus permitting the grooming portion 10A to remain substantially parallel to the grooming portion 11A. It will also be noted that the bends 11D are without teeth thus to ensure that no cutting action results as the animal's hide is groomed.

We claim:

1. An animal grooming implement comprising relatively long and flexible blade means, and a pair of hand grips to which the blade means are connected, said blade means including first and second blades, corresponding edges of said blades including grooming teeth, means to space a central portion of one blade from the central portion of the other blade, said central portions normally straight and parallel, and means connecting one end of said first blade to said second blade so that it may slide relative thereto as the blades are curved by drawing the hand grips towards each other, said central portions remain parallel during use of the implement.

2. the animal grooming implement of claim 1 in which a first hand grip receives interiorly one pair of corresponding blade ends and one end of said first blade is free of teeth, said first hand grip slidably confining said one end and being the means connecting said one blade end to permit such relative sliding movement.

3. The implement of claim 2 in which the hand grips are in the form of sheaths each having an open-ended slot dimensioned to receive corresponding ends of the two blades, and the extremity of said one blade end that is without teeth is normally spaced from the closed end of the slot in which it is entered and has a portion extending outside said slot.

4. The implement of claim 3 in which the blade having said spaced central portion is said first blade and said blade having an end portion without teeth is said second blade.

5. The implement of claim 4 in which said first blade includes an angularly disposed portion between each end and said grooming portion and said angularly disposed portions are without teeth.

6. The implement of claim 1 in which the teeth of the two blades are oppositely inclined lengthwise of the blades.

7. The implement of claim 2 in which each hand grip has slot shaped and dimensioned to receive a pair of blade ends and of a material into which the blade teeth will bite, the teeth of the blade remote from the user of a pitch such that at one end said teeth resist movement out of said second hand grip, and means anchoring the other end of said remote blade to said first hand grip.

8. The implement of claim 7 in which the teeth of the blade having an end free of teeth have a pitch opposite to those of said remote blade.

9. The implement of claim 7 and means anchoring both of said blade ends within said first hand grip.

10. The implement of claim 8 in which the remote blade includes the offset grooming portion.

* * * * *